United States Patent [19]
Biasini

[11] Patent Number: 5,495,951
[45] Date of Patent: Mar. 5, 1996

[54] MOBILE MUSIC STAND CART AND METHOD

[75] Inventor: Americole Biasini, Bellingham, Wash.

[73] Assignee: Manhasset Speciality Co., Yakima, Wash.

[21] Appl. No.: 204,646

[22] Filed: Mar. 1, 1994

[51] Int. Cl.⁶ ..................................... A47F 7/00
[52] U.S. Cl. ................ 211/13; 211/60.1; 280/79.3
[58] Field of Search ............... 211/13, 60.1, 133; 280/79.3

[56] References Cited

U.S. PATENT DOCUMENTS

| | | |
|---|---|---|
| 1,912,264 | 6/1933 | Stannard . |
| 2,311,422 | 2/1943 | Walling . |
| 2,919,809 | 1/1960 | Dunbar ........................................ 211/13 |
| 3,712,638 | 1/1973 | Lipinsky . |
| 3,955,926 | 5/1976 | Riedesel . |
| 4,221,395 | 9/1980 | Carte . |
| 4,315,633 | 2/1982 | Boeddeker et al. ................. 280/79.3 |
| 5,296,030 | 3/1994 | Young ................................. 211/13 X |

Primary Examiner—Robert W. Gibson, Jr.
Attorney, Agent, or Firm—Stratton Ballew

[57] ABSTRACT

A mobile music stand rack having forward and rear support frames, an upper longitudinal elongate guide section and a lower longitudinally extending support section. These are arranged so that the music stands that are loaded onto the rack are positioned along the longitudinal center line. The rack is supported by forward and rear centrally located swivel mounted wheels, and by two side wheels at the mid-location of the rack. This provides stability for the rack, while permitting it to be conventiently maneuvered.

7 Claims, 7 Drawing Sheets

MOBILE MUSIC STAND CART AND METHOD

FIELD OF THE INVENTION

A. Background of the Invention

The present invention relates to a mobile music stand rack and method whereby music stands of more or less conventional design can be conveniently positioned on the rack and removed therefrom, and the rack with the stands can conveniently and safely be moved to storage location for the stands.

B. Background Art

A conventional design for a music stand which has been in existence for many, many years is one that has a rectangular platform or panel which is positioned at an inclined angle, on the top of an adjustable support column or post, with the post being supported from a base which is commonly made up of three legs extending outwardly from a center location at 120° angles with respect to one another.

Quite often, these music stands are used for musical instruction at an educational institution or by musical groups or orchestras. It often becomes necessary to set up the music stands for music practice (or a musical performance) and then remove the music stands from that location for storage. There have been designs where the music stand is collapsible (thus facilitating storage).

An alternative approach has been to store the music stand in its existing configuration. One such music stand cart or rack is shown in U.S. Pat. No. 4,315,633 (Boeddeker et al), and also in Des. No. 268,140 (Tenner). This is a mobile music cart, having a forward and rear pair of ground engaging wheels, supporting forward and rear frame sections. There are upper and lower parallel pairs of longitudinal mounting rods which slant at an angle of about 30° to the horizontal. The music stands are placed in this cart for storage by lifting the stand to the height of the upper end of the rack and placing an upper column portion of the stand between the upper rods, and one arm or member of the base support in the passageway defined by the lower two rods. Each stand is moved from the upper location of the two sets of rods downwardly and forwardly to a lower end location. The music stands are positioned one against the other and in somewhat nested fashion until the rack is full.

There are a number of other types of mobile storage carts that appear in the patent literature. Among these are the following:

U.S. Pat. No. 4,221,395 (Carte) shows a trailer designed to carry hurdles which are used in track meets for the hurdle races. This trailer comprises a longitudinally extending elongate beam having stanchions 21 standing upwardly from the beam and transverse arms 22. The hurdles are mounted on the arm members on opposite sides of the beam, and the forward end of the beam has a socket type hitch 18 by which the trailer is towed.

U.S. Pat. No. 3,955,926 (Riedesel) shows a mattress carrier having a horizontal platform supported by front and rear wheels and a rectangular framework positioned on top of the platform.

U.S. Pat. No. 2,311,422 (Walling) shows a "janitor's cart". This is a wheeled cart having an upstanding framework to carry instruments, and also a trash carrying location.

U.S. Pat. No. 1,912,264 (Stannard) shows a wheeled rack to carry chairs. There is a rectangular frame having front and rear wheels. Opposite sides of the rear edge of the chair seat have hook members 31 and 32 thereon, and when the seat is in a folded position, these hook members 31 and 32 are in an upper position to rest upon side rails and thus support each chair in the rack.

When music stands are used in an undergraduate educational institution (high school, junior high school, or even in grade school), it often happens (particularly where there is not a dedicated "band room" where the music stands might be left in place for weeks at a time) that it is necessary to store the music stands, take them out again for practice, store them again, etc. This task often is performed by the students or others who are not practiced in this task, possibly in a rush, or inattentive in the details of the task. Also, some of the younger students (possibly a small girl) may be somewhat lacking in physical size or strength to be able to handle conveniently, even a relatively simple task such as moving a music stand into a storage rack. Accordingly, it is desirable that such a music storage device (particularly a movable or mobile music stand storage device) be convenient, reliable and "user friendly". Even if there is a dedicated band room where the music stands are set up, in many instances the music stands are stored at the end of the day so that custodial chores could be accomplished, such as sweeping the band room floor.

Also, when the music stand rack is being moved from one location to the other, it needs to be relatively stable, and also should be easy to maneuver.

Further, from a structural and manufacturing perspective, it is desirable that the basic design to accomplish the objectives noted above should be such that the loading on the structural members be such that there can be achieved economy in the design, and also so that the manufacture and assembly can conveniently be accomplished.

SUMMARY OF THE INVENTION

The music stand storage rack of the present invention is arranged to support a plurality of music stands comprising an upper laterally extending panel section, a vertical support column, and a base having support means extending outwardly from the lower end of the support column. The storage rack has a front end, a rear end, and a forward to rear extending longitudinal center axis.

The rack comprises a central longitudinally extending support guide section which comprises the following. There is an upward guide section comprising a pair of laterally spaced, horizontal upper guide rods defining therebetween a substantially unobstructed passageway to receive an upper portion support columns of the music stands, and having upwardly facing support surfaces to engage lower position edges of the panel sections of the music stand. There is also a lower longitudinally extending lower support means, providing an elongate upwardly facing support rod means to engage a lower central surface portion of the base if the music stands.

There is a forward frame section connected to the upper guide rods to the lower support rods means. The forward frame section presents an unobstructed entry area leading into the passageway of the upper guide rods and also has laterally spaced side support members defining a forward open area sufficiently wide to permit the base of the music stand to pass therethrough. There is a rear frame section connected to the guide rods and to the lower support rod means. The rear frame has a stop means positioned adjacent to the guide rods and adjacent to the rear frame section. The support surfaces of the guide rods are spaced above the support means of the lower rod means by a vertical distance less than a vertical distance between a lower central support portion of the base and the lower position edges of the panel section. This is done in a manner that a forwardmost music stand can be supported on the rack with the base of the forwardmost music stand resting on the lower support rod means at a slant to the vertical, and with the panel section resting on the upper guide rods. The forwardmost music stand is prevented by stop means from passing unobstructedly out the rear end of the rack.

There is a pair of rearwardly spaced ground support wheels positioned at central support locations of the rack on opposite sides of the rack and constrained for rotation along horizontal transverse axes.

There is a forward swivel mounted ground engaging wheel mounted at the front end of the rack and centered on the longitudinal axis. There is also a rear swivel mounted ground engaging wheel positioned at the rear end of the rack and centered on the longitudinal axis.

The rear frame section is arranged to define a through opening at the rear end of the upper guide rods to permit the column of the music stand to pass out of the rear end of the rack. The rear frame section is arranged to provide a rear opening sufficiently large to permit passage of the panel section and base of the music stand.

In the method of the present invention, a music stand rack is provided as indicated above. The music stands are stored by moving each stand through the front frame with the column moving into the passageway between the upper guide rods. The music stands are stored in a slanting position, with the base supported by the lower rod means, and the panel resting on the upper guide rods.

Also in the method, the music rack is maneuvered by pivoting the music stand about an axis extending transversely between the two side wheels.

Other features of the present invention will become apparent from the following detailed description.

DESCRIPTION OF THE PREFERRED EMBODIMENTS

Figure 1:
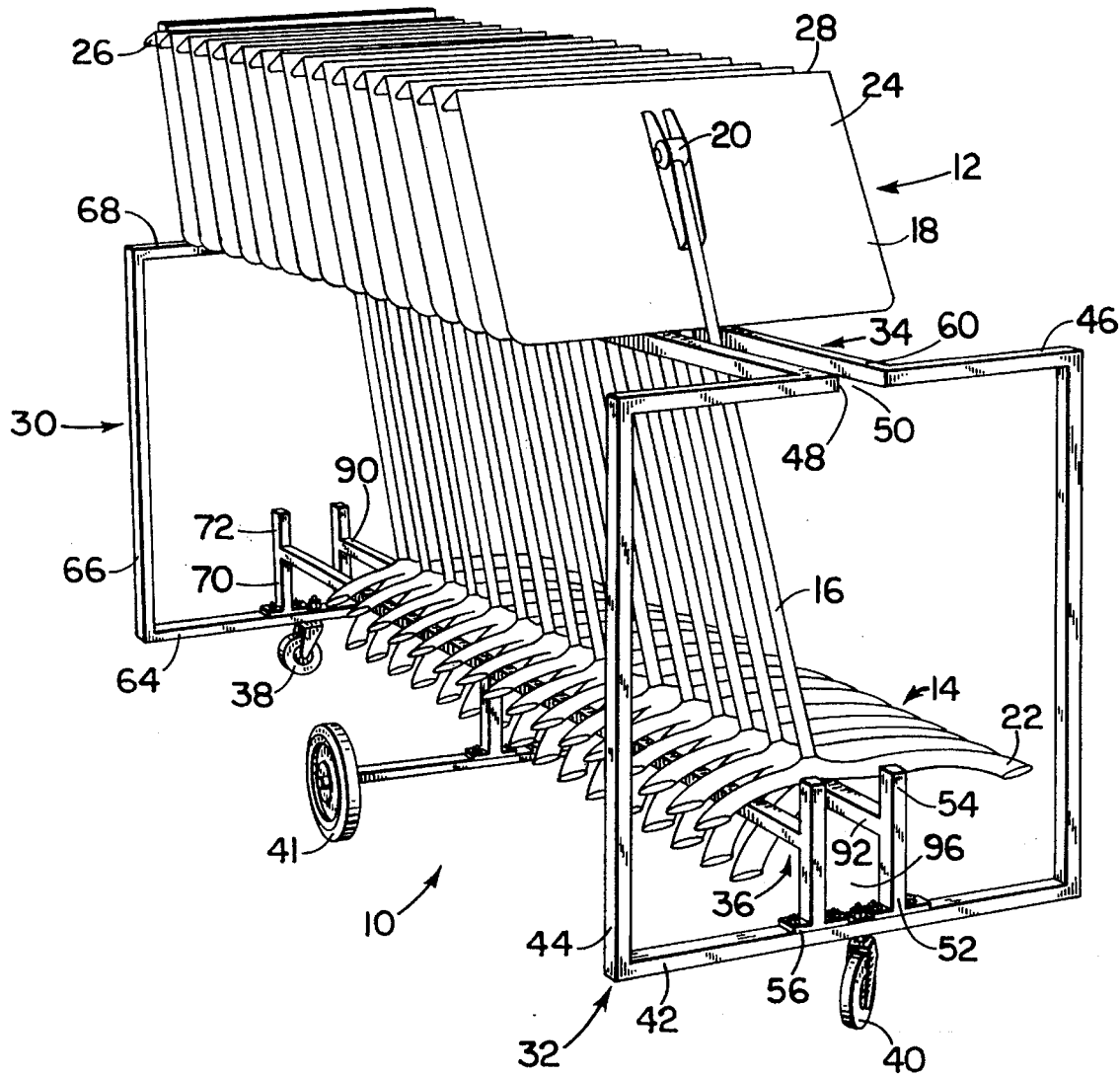
FIG. 1 is an isometric view showing the music stand rack of a first embodiment of the present invention, with a load of music stands mounted to the rack in a stored position.

In FIG. 1, there is shown a first embodiment of the music stand rack 10, with a near full load of music stands 12 mounted thereon. It is believed that a clearer understanding of the present invention will be achieved by first describing briefly the prior art music stands 12 which are stored on the rack 10, and then presenting a more detailed description of the rack 10.

The music stands 12 shown herein are typical of many music stands that have been in the prior art for many years. As shown, these comprise a base 14, a support column 16, and a music support panel 18 which is pivotally mounted at 20 to the upper end of the column 16. The base 14 is commonly made up of three elongate feet or support members 22 which extend radially outwardly from the lower part of the column 16 at 120° angles from one another. The support column 16 can be constructed to be vertically adjustable.

Figure 5:
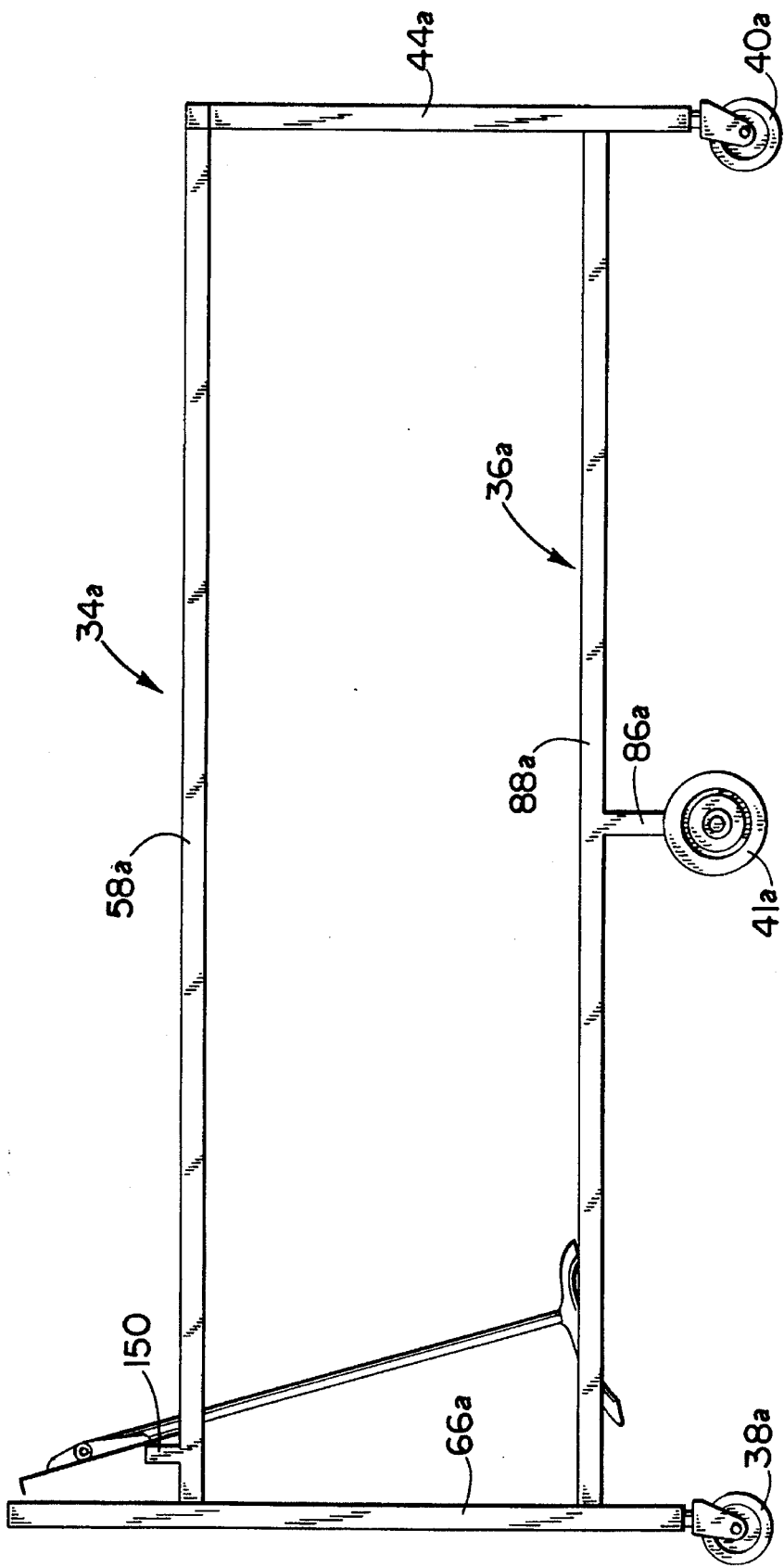
FIG. 5 is a side elevational view of the second embodiment of FIG. 4.

The panel 18 comprises a main rectangularly shaped panel section 24, and there is a lower support ledge or flange 26 which extends at right angles from the lower edge 28 of the panel section 24. In FIGS. 1 and 5, each panel section is shown having been folded down to its stored position where the flange 26 is at an upwardly positioned location.

The music stand rack 10 comprises a rear support frame 30, a forward support frame 32, an upper elongate guide section 34 and a lower support section 36. There are rear and forward center swivel mounted ground support wheels 38 and 40, respectively, each mounted for a full 360° rotation about a vertical axis, and two side wheels 41 laterally spaced from one another and positioned at a mid-length of the rack 10.

The front support frame 32 has a generally rectangular configuration and comprises a lower bar 42, two side bars 44 rigidly connected to and extending upwardly from opposite ends of the lower bar 42, and two upper bar sections or arms 46 connected to the upper ends of the side bars 44 and extending laterally inwardly toward one another. The inner ends 48 of the two arms 46 are spaced about three inches from one another and define a center opening 50 to receive an upper part of the support column 16 of the music stands 12.

Mounted to the middle of the lower bar 42 are two upstanding, laterally spaced arms 52. These arms 52 perform two functions. First, they provide support for the lower support section 36. Second the upper ends 54 of these vertical arms 52 provide a stop to prevent the base of an adjacent stand 12 from accidentally moving outwardly from its storage position on the rack 10. Each of the arms is held in place by suitable mounting brackets 56.

The upper guide section 34 comprises two horizontal, parallel, laterally spaced, elongate guide bars 58, the front ends 60 of which are rigidly connected to the inner ends 48 of the arms 46. The rear ends 62 of the arms 58 are fixedly connected to the aforementioned rear support frame 30.

The rear frame 30 has a rectangular configuration which has the same overall size and shape as the front frame 32. Specifically, there is a lower horizontal bar 64, two side bars 66, and a single upper bar 68 extending entirely across the width of the rear frame 30 and fixedly connected to the upper ends of the side bars 66.

Fixedly attached to the middle lower part of the lower horizontal bar 64 are two upstanding stop arms 70 which have upper end portions 72 that are able to engage the base 14 of the rearmost music stand 12. Also these arms 70 connect the the lower support section 36.

Fixedly attached to the upper bar 68 is a push handle 76, comprising an upper horizontally extending push bar 78, and two vertical mounting struts 80 that attach by their upper ends to the bar 78 and by their lower ends to the bar 68.

Each of the rear and forward wheels 38 and 40 is mounted to a related swivel assembly 82 bolted to a respective one of the lower bars 64 and 42. The swivel assemblies 82 are or may be conventional. The two side wheels 41 are rotatably mounted to a transversely horizontally extending axle 84 that is connected to and positioned below the support section 36. This axle 84 connects to the lower ends of two vertically extending arms 86, the upper ends of which connect to, and support, the center part of the support section 36.

The aforementioned support section 36 comprises two laterally spaced longitudinally extending bars 88 that are positioned directly below the two upper rods or bars 60. The rear and front ends 90 and 92 of each bar 88 are fixedly connected to the rear and forward arms 70 and 52, respectively.

The entire music stand rack is made as a substantially rigid structure (except of course for the wheels 38, 40 and 41).

To describe the manner in which the music stands are stored on the rack 10, initially, the panel 18 is rotated about the pivot mounting 20 to the down position as shown in FIG. 1. Then each music stand 12 is lifted off the floor, and the upper part of the column 16 is moved into the entryway 50 and into the passageway 93 defined by the two upper bars 60. At the same time, the base 14 is moved over the stop members 54 and above the two bars 88 that comprise the lower support section 36. This can be accomplished either by moving the forwardmost support member 22 through the lower opening 96 defined by the two arms 52. Alternatively, the arms 22 can be positioned to straddle the two bars 88. Each stand 12 is moved toward the rear end of the rack 10.

The forwardmost stand 12 is positioned so that the panel section 18 rests against the two bars 80. The main support for the stand 12 is provided by the base section 14 resting on the lower support section 88. The downwardly positioned edges 98 of each panel section 18 rests on the upper guide bars 60. Then subsequent music stands are mounted onto the rack in the same manner, and this can be accomplished until the rack is substantially filled.

It is to be noted that the manner in which the music stands 12 are loaded onto the rack 10 causes the weight of the stands to be equally distributed on both sides of a center axis 100 of the support rack 10, the reason for this being that the support column 60 is constrained to be positioned within the upper guide bars 60 and rests at a central location on the lowermost support section 36.

Figure 3:
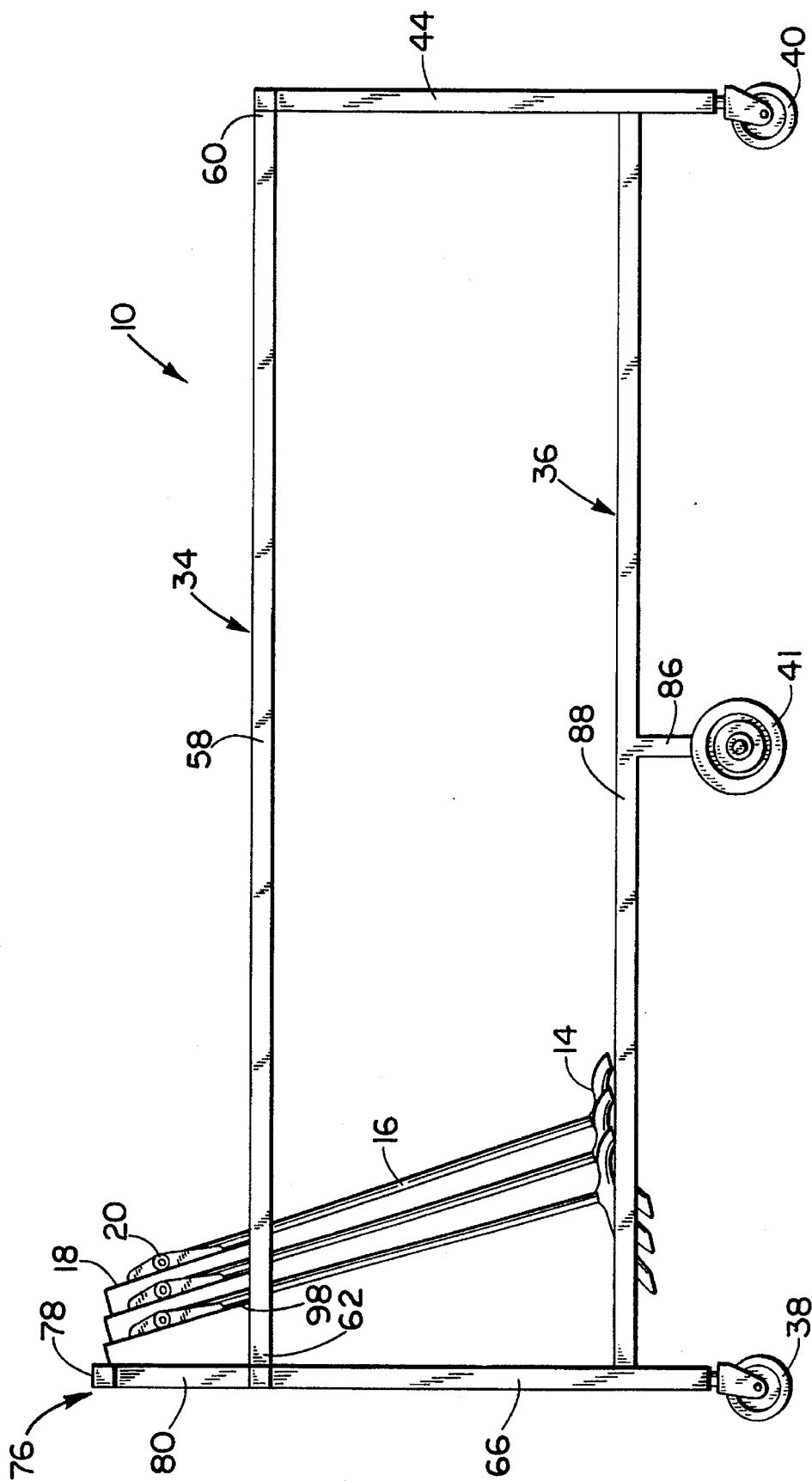
FIG. 3 is a side elevational view of the rack of FIGS. 1 and 2.

Also, the support rack 10 itself is built symmetrically so that its center of gravity is also aligned on the center axis 100. Thus, the front and rear support wheels 38 and 40, being positioned on the center axis 100, are necessarily positioned along a line vertically aligned with the center of gravity of the rack 10 itself, when empty, and also aligned with the center of gravity if the rack 10 is either partially loaded (as in FIG. 3), or fully loaded (as in FIG. 1). The significance of this will be discussed further below.

Figure 7:
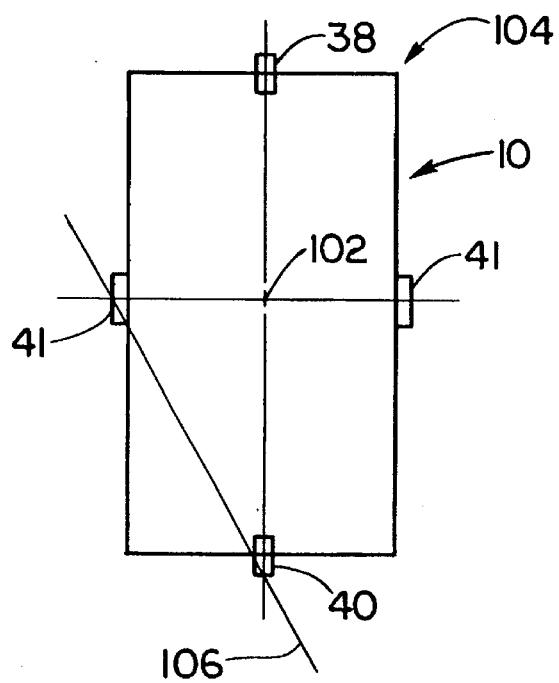
FIG. 7 is a schematic top plan view of the rack of the present invention, illustrating the manner in which the vertical loads are carried by the rack of the present invention.

To illustrate certain functional features of the rack 10, reference is now made to FIG. 7 which is a somewhat schematic top plan view of the support rack 10, where the rack 10 is shown as a rectangle, the four wheels 38, 40 and 41 are shown, and also the longitudinal center axis 100. Let us assume that the rack 10 is fully loaded with music stands. As indicated above, the music stands are constrained to be symmetrically loaded so that the center of gravity 102 is on the center axis 100, at (or very close to) a transverse axis passing through the two side wheels 41.

As the support rack 10 is pushed forwardly along a straight line parallel to the center axis 100, it can be appreciated that the rack 10 with the music stands 12 mounted thereon is quite stable. Any forward to rear tipping is resisted by either the rear or front wheel 38 or 40. Any side tipping is resisted by one or the other of the side wheels 41. Since the center of gravity 102 is at the center of the rack 10, this offers substantial stability.

However, let it be assumed that there is some sort of diagonal load, exerted, for example, along the line indicated at 104 in FIG. 7. It will be noted that the more distant wheels 41 and 40 define a ground engaging axis 106 about which the rack 10 could tend to tip. However, it can be seen that the center of gravity 102 is positioned a significant distance from the axis 106, so that substantial stability is provided when the rack is subjected to this kind of a force. Obviously, a lateral load (indicated by the arrow 108) at the center of rack 10 is resisted by the far side wheel 41.

It often happens that the tipping of most any sort of mobile cart or rack is most likely to occur when a turning maneuver is attempted. Analysis will indicate that the forces created by a turning movement with the present invention are reacted in a manner to not only provide stability, but also make the turning more easily accomplished. This will be explained further below.

Since the rear and forward wheels 38 and 40 swivel, and since the side wheels 41 are constrained to permit movement in only forward and rear directions, any rotation about a vertical axis of the cart 10 is constrained to rotate about a transverse, horizontal axis, to occur along a line passing through the two side wheels 41. Since the center of gravity 102 is at, or at least very close to the actual geometry center of the cart 10, for purposes of discussion, we will simply consider the point 102 as the geometric mid-point of the storage rack 10.

Figure 8:
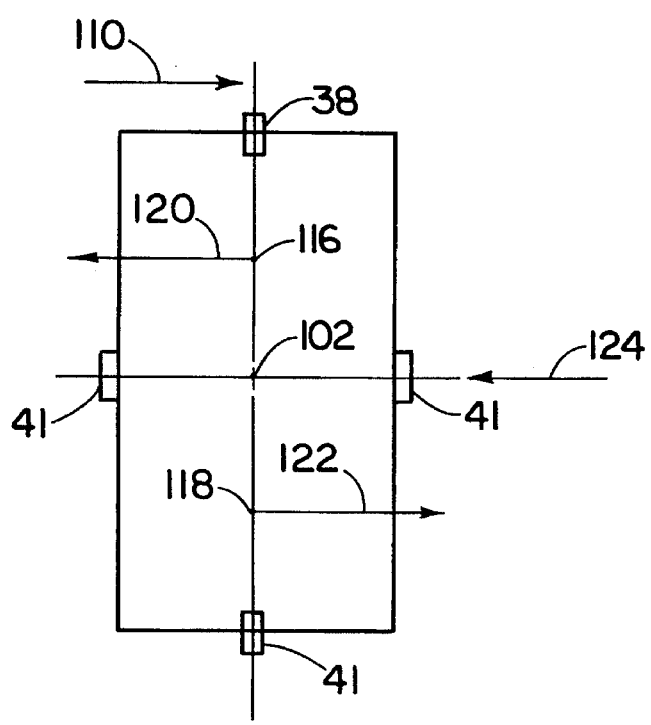
FIG. 8 is a view similar to FIG. 7, illustrating the manner in which turning forces are reacted in the rack.

With reference to FIG. 8, let us examine the lateral forces exerted in a simple turning motion where the storage rack 10 is being pushed in a forward direction, and it is desired to make a 90° turn. The person who is grasping the push bar 78 would exert a lateral force at that location, this being indicated by the arrow 110. If we ignore for purposes of analysis the linear movement of the rack 10, we can consider the center of rotation to be about the center point 102. For the moment, let us ignore the effect of friction, such as might occur from the swivel mounted wheels 38 and 40 being caused to rotate, and also the small amount of friction provided by the side wheels 41.

The main resisting force to this turning force 110 are the two inertial forces provided by the front and rear portions of the loaded rack 10, with the music stands 12 loaded thereon. The front half is indicated at 112, and the rear half at 114. The transverse center axis is indicated at 115. The front section 112 has a center of inertia indicated at 116, approximately mid-way between the rear end of the rack 10 and the transverse center axis 114. In like manner, the front portion of the rack has a center of inertia at 118 approximately mid-way between the transverse center axis 115 and the front end of the rack 10.

The inertial force at 116 is exerted into the rack 10 in a direction opposite to the moving force 110, and this inertial force is indicated at 120. On the other hand, since the rear half portion 114 of the rack 10 rotates in a direction opposite to that of the front half 112, the inertial force at 118 is in the opposite direction, and this inertial force is indicated at 122. Since the distance from the point 116 to point 102 and also the distance from the point 118 to the center point 102 is half the distance of the location of the handle 78 to the center point 102, and since the moments must balance around the center location 102 (the moment being equal to the force times the length of the moment arm), analysis indicates that the force 110 would be equal to the force 120 and also equal to the force 122.

However, in addition to the moments balancing, it is necessary that the lateral forces balance. Analysis indicates that the total lateral force resulting from the turning force (indicated at 110) exerted on the handle 78 would necessarily be reacted entirely at the location of the one side wheel 41 that is in the outside of the turn. This lateral resisting force is indicated at 124 and it is equal to the force 110.

A preferred embodiment of the storage rack of the present invention has a total length dimension of six feet. Thus, with the turning axis being at the center 102, this turning maneuver can easily be accomplished about a relatively short turning radius, and in a more confined turning area. If we assume a given rate of forward speed (e.g. two to three miles per hour), and if a turn about a given radius is to be made, it can be seen that because the handle at 78 would be moved a relatively short distance in an arc laterally (in comparison with a conventional cart where there would be a set of turning wheels at either the front or the rear end of the carts), a relatively small turning force would have to be applied to the storage rack 10 of the present invention.

The above explanation is somewhat simplified. The actual force moment which would tend to tip the rack 10 over (ignoring for the moment any centrifugal force that would act on any cart or rack which is traveling forwardly and making a sharp turn) would result in large part from the lateral force 110 being exerted at a higher location (i.e. at the handle 10) and the inertial forces in the rack 10 and the music stands 12 mounted thereon, and also how there are reacted into the ground engaging wheels. However, regardless of the accuracy of the above analysis, actual use of the rack 10 (when loaded) verifies its ability to be maneuvered easily while remaining quite stable.

Figure 2:
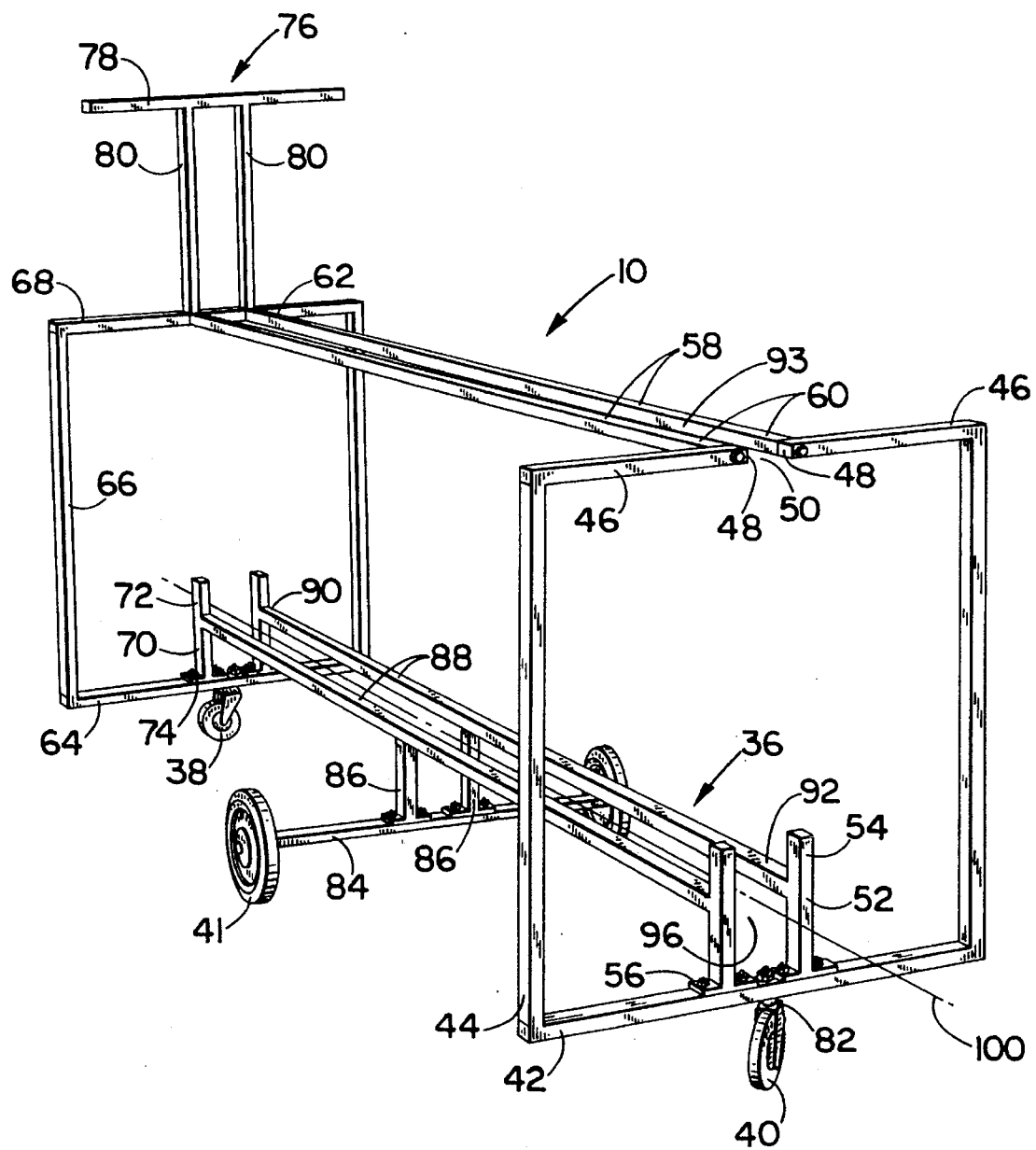
FIG. 2 is an isometric view similar to FIG. 1, but not showing the music stands.

To discuss another benefit of the present invention, let us now look at the structural loading in the rack 10, as shown in FIG. 2. Most all of the weight is carried by the two lower bars 88. These elongate bars or rods 88 are supported at three locations, namely the location of the rear wheel 38, the forward wheel 40, and at 10 the axle 84. Assuming that the music stands 12 are distributed substantially evenly over the length of the two bars 88, approximately one half of the weight is carried by the middle wheels 81, with a quarter of the weight being carried at the end swivel wheels 38 and 40. In effect, both the front half and the rear half of the elongate support rods or bars 88 act as beams. These "half length" beams carry one half the weight over one half of the span. Thus, the bending moments on the front and rear half of the bars 88 are reduced by one quarter, in comparison to a situation if there were no middle wheels 41 at all. In actuality, the bending moments are even somewhat less than one quarter, since the rods 88 are continuous, and in the area where these rods 88 extend over the two vertical support struts 86, there is a reverse bending moment. Thus, in addition to this arrangement of the wheels 38, 40 and 41 contributing to the mobility and convenience of the rack 10, these also contribute to carrying the load more effectively through the load bearing members 88.

In addition, these rods 88 serve another function, and that is that any laterally directed rotational movement of either the front frame 42 or the rear frame 68 are transmitted into the rods 88 and thence through the struts 86 into the axle 84 and into the side wheels 41, these causing the lateral force to act at the location of the wheels 41.

Figure 4:
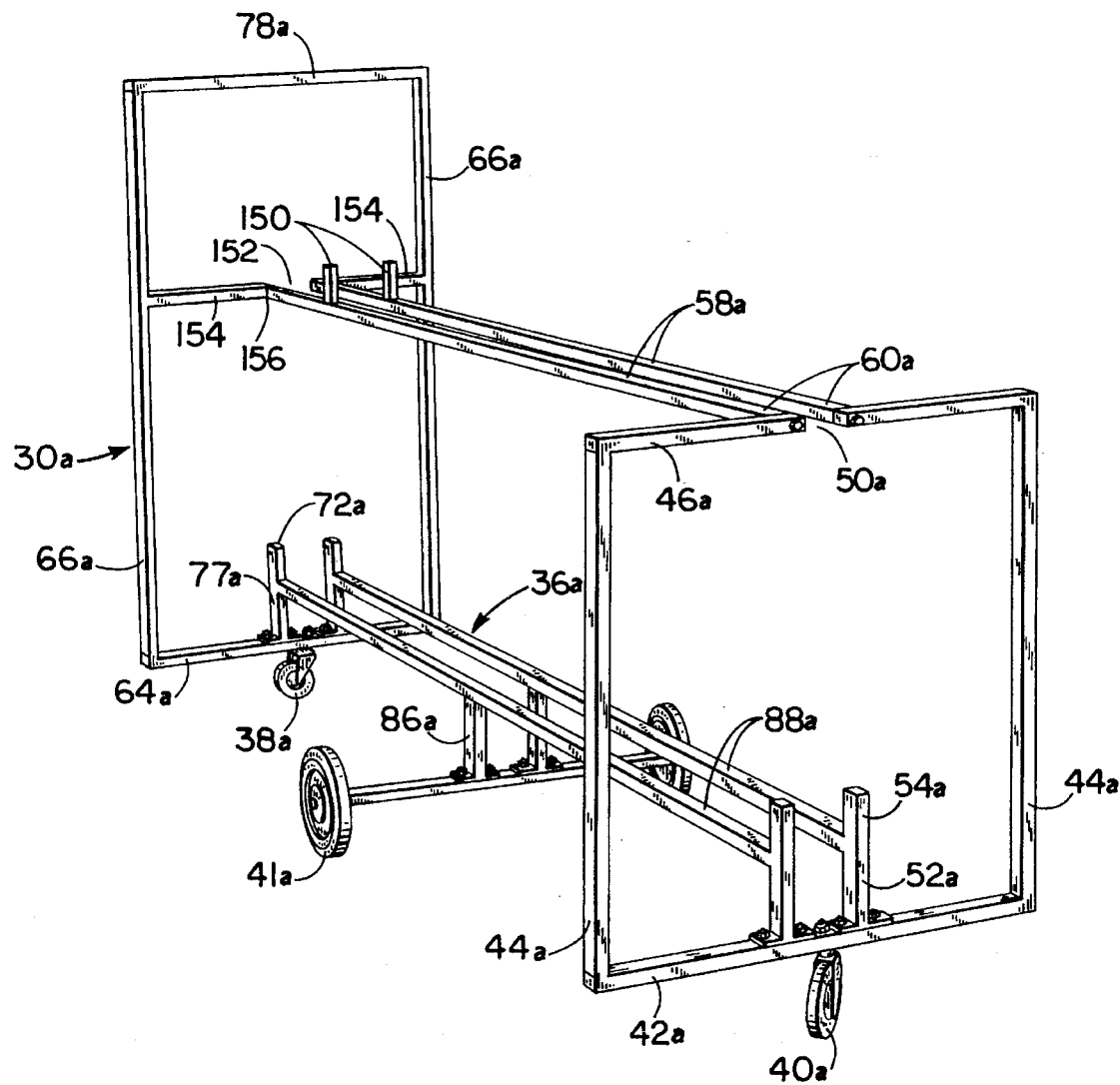
FIG. 4 is an isometric view similar to FIG. 2, showing a second embodiment of the present invention.

The second embodiment of the present invention is illustrated in FIGS. 4 and 5. Components of the second embodiment which are similar to components of the first embodiment of FIGS. 1 through 3 will be given like numerical designation, with an "a" suffix, distinguishing those of the second embodiment. It can be seen that the front frame 32a and the lower support section 36a are substantially identical to the corresponding components 32 and 36 in the first embodiment of FIGS. 1 through 3. Also, the wheels 38a, 40a, and 41a are substantially identical to the corresponding components of the first embodiment of FIGS. 1 and 2.

The two upper guide bars 58a differ from the guide bars 58 of the first embodiment in that at the forward end there is a pair of upright stop members 150. The reason for this is that the rear end of the two guide rods 58a is open at 152. These stop members 150 position the most rearward music stand and prevent it from passing out from the end opening at 152, unless it is first lifted a short distance.

The rear frame 30a has a somewhat different configuration. There is a lower rod 64a, and two side rods 66a. However, the two side rods 66a extend upwardly to a higher level and connect to an upper cross-bar 78a which essentially serves two functions. First, the cross bar 78a connects to the two vertical rod members 66a to form a rigid rectangular frame with the lower bar or rod 64a. Second this bar 78a serves as the steering bar, and thus serves the same function as the bar 78 in the first embodiment of FIGS. 1 through 3.

There are two arms 154 which extend inwardly to connect at 156 to the rear ends of the two guide rods 58a. Thus, it can be seen that these arms 154 serve substantially the same function as the arms 46 of the first embodiment The mode of operation of this second embodiment of FIGS. 4 and 5 is substantially the same as in the first embodiment with regard to travel, maneuverability, and stability of the rack 10a. Also, the basic method of loading is substantially the same as in the first embodiment, except that in the second embodiment, the stop members 150 engage the music stand panel 18 and thus position the music stands 12.

The main difference is in the unloading the music stands 12. The area above the bars 154 and below the upper bar 78a is sufficiently large that it enables the panel 18 of the music stand 12 to pass through. Thus, it becomes readily apparent that the rack 10a can be unloaded from both the front and the rear. Also, it would be possible to simultaneously load from the front and the rear. For example, when the loading takes place from the front, the music stands 12 could be moved half way down the length of the rack 10a. At the same time, several music stands 12a could be moved into the storage position through the rear opening 152, and after a number of these are in place, they could simply be tilted in an upward and rearward slant. Other techniques could be used also.

Figure 6:
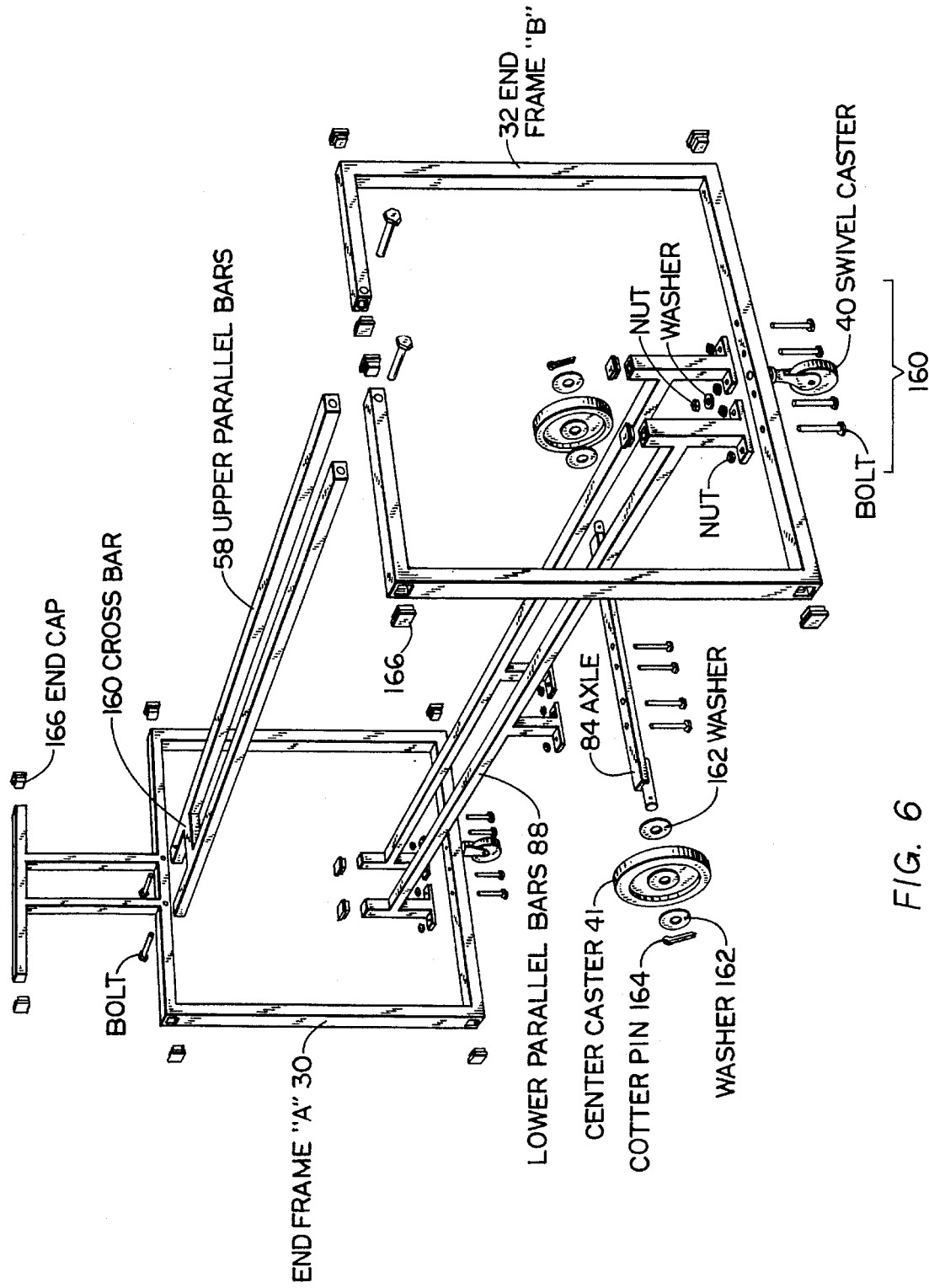
FIG. 6 is an isometric exploded view of the first embodiment, showing the component parts disassembled and in position to be assembled.

FIG. 6 illustrates the storage rack 10a of the first embodiment, with the components in a preassembled arrangement. The front and rear frames 32 and 30 are welded as unitary structures. The guide rods 60 are connected by a cross bar 160 (which can also function as a stop member) and these are provided as a unitary structure. The two support rods 88 are each fixedly attached to the forward 52 and rear 70 arms. The axle 84 is provided separately.

It can be seen that these components are joined by a variety of nuts and bolts, some of which are indicated at 160, along with washers 162 and cotter pins 164 as needed. Also, there are end caps 166 provided at various locations to close the open ends of the various bars or rods that are welded together. Since the manner in which these components can be connected and assembled is readily apparent from a viewing of FIG. 6, these will not be described further herein.

What is claimed:

1. A mobile music stand storage rack arranged to support a plurality of music stands, each stand comprising an upper laterally extending panel section, a vertical support column, and a base having support means extending outwardly from a lower end of said support column, said storage rack having a front end, a rear end, and a forward to rear extending longitudinal center axis, said rack comprising:

a. a central longitudinally extending support/guide section, comprising;

i. an upper guide section comprising a pair of laterally spaced, parallel upper guide rods defining therebetween a substantially unobstructed passageway to receive an upper portion of support columns of the music stands, said passageway aligned along said longitudinal center axis, said upper guide rods each having an upwardly facing upper support surface to engage lower positioned edges of the panel sections of the music stands in a manner to constrain upper ends of the support columns to be centrally located along said longitudinal center axis ii. a lower longitudinally extending lower support means providing an elongate upwardly facing lower support surface to engage a lower base surface portion of the base of each music stand;

b. a forward frame section connected to the upper guide rods and to the lower support means, said forward frame section presenting an unobstructed entry area leading into the passageway and having laterally spaced side support members defining a forward open area sufficiently wide to permit the base of each music stand to pass therethrough;

c. forward stop means connected to said forward frame section adjacent said lower support means for preventing the base of a forwardmost music stand from moving forwardly outward from a storage position in the rack;

d. a rear frame section connected to the upper guide rods and to said lower support means;

e. a pair of laterally spaced ground support wheels positioned at a central support location of said rack on opposite sides of the rack and constrained for rotation along horizontal transverse axes; and f. a forward swivel mounted ground engaging wheel mounted at the front of the rack and centered on said longitudinal axis, and a rear swivel mounted ground engaging wheel mounted at the rear of the rack and centered on said longitudinal axis, whereby when the rack is loaded from the front to the rear of the rack with a plurality of music stands a center of collective mass of the music stands is constrained to be located along the longitudinal center axis of the rack near the central support location, and lateral loads produced by a turning force applied to the rack are reacted mainly into one or the other of the side wheels, thereby enhancing stability and turning maneuverability of the rack.

2. The rack as recited in claim 1, wherein said rear frame section is arranged to define a through opening at the rear end of said upper guide rods to permit the column of each music stand to pass out of the rear end of the rack, and wherein said rear frame section is further arranged to provide a rear opening sufficiently large to permit passage of the panel section and base of each music stand out of the rear end of the rack.

3. The rack as recited in claim 1, wherein said upper support surfaces of the upper guide rods are spaced above the lower support surface of the lower support means by a vertical distance less than a vertical distance between a lower central portion of the base and a lower positioned edge of a panel section of a music stand in a manner that the music stand can be supported in said rack with the base of the stand resting on the lower support surface at a slant to the vertical with the panel section resting on the upper support surfaces of the upper guide rods, and with the base of the stand being prevented by the forward stop means from passing unobstructedly out the forward end of the rack.

4. The rack as recited in claim 1, wherein said lower support means include a pair of laterally spaced, parallel lower support bars oriented horizontally and positioned below, and parallel to, the upper guide rods.

5. The rack as recited in claim 4, wherein said forward stop means include a pair of upstanding, laterally spaced stop arms connected to rear ends of said lower support bars and having upper end portions configured to engage the base of a music stand.

6. The rack as recited in claim 1, including a push handle having an upper, horizontally extending push bar connected to said rear frame section by one or more vertical mounting struts, said push handle configured to provide a rear stop whereby the panel section of a rearmost music stand rests against the push handle when the stand is placed in said storage position.

7. The rack as recited in claim 1, wherein said laterally spaced ground support side wheels are mounted to a transversely, horizontally extending axle connected to and positioned below the lower support means near said central support location, whereby rotation about a vertical axis of the rack is constrained about a transverse, horizontal axis of the rack to occur along a line passing between the side wheels, said line coincident with a longitudinal axis of the axle.

\* \* \* \* \*